(12) United States Patent
Hsu et al.

(10) Patent No.: US 6,700,297 B2
(45) Date of Patent: Mar. 2, 2004

(54) SUPERCONDUCTING PM UNDIFFUSED MACHINES WITH STATIONARY SUPERCONDUCTING COILS

(75) Inventors: John S. Hsu, Oak Ridge, TN (US); S. William Schwenterly, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/339,745

(22) Filed: Jan. 9, 2003

(65) Prior Publication Data

US 2003/0094880 A1 May 22, 2003

Related U.S. Application Data

(63) Continuation-in-part of application No. 09/872,048, filed on Jun. 1, 2001, now Pat. No. 6,573,634.
(60) Provisional application No. 60/413,248, filed on Sep. 24, 2002.

(51) Int. Cl.$^7$ ................................................. H02K 1/22
(52) U.S. Cl. .................. 310/266; 310/156.07; 310/190; 310/191; 310/186; 310/181; 310/168; 310/263
(58) Field of Search ............................ 310/156.07, 190, 310/191, 186, 181, 168, 263, 266

(56) References Cited

U.S. PATENT DOCUMENTS 3,582,849 A  *  6/1971  Post et al. ................... 335/213
6,169,353 B1     1/2001  Driscoll et al.
6,313,556 B1  * 11/2001  Dombrovski et al. ......... 310/91
6,441,521 B1     8/2002  Dombrovski et al.
6,489,701 B1  * 12/2002  Gamble et al. ............. 310/179
2002/0121837 A1  9/2002  Dombrovski et al.

OTHER PUBLICATIONS

David Madura et al., "Tests Results of a 5000HP HTS Motor," The Applied Superconductivivity Conference, Houston, Texas, Aug. 6, 2002.

Bruce B. Gamble et al., "The Status of HTS Motors," IEEE PES Meeting, Chicago, Illinois, Jul. 2002, IEEE CD ISBN 0–7803–7518–1.

Swarn S. Kalsi, "Development Status of Superconducting Rotating Machines," IEEE PES Meeting, New York, Jan. 27–31, 2002.

* cited by examiner

Primary Examiner—Thomas M. Dougherty
Assistant Examiner—J. Aguirrechea
(74) Attorney, Agent, or Firm—Quarles & Brady LLP

(57) ABSTRACT

A superconducting PM machine has a stator, a rotor and a stationary excitation source without the need of a ferromagnetic frame which is cryogenically cooled for operation in the superconducting state. PM material is placed between poles on the rotor to prevent leakage or diffusion of secondary flux before reaching the main air gap, or to divert PM flux where it is desired to weaken flux in the main air gap. The PM material provides hop-along capability for the machine in the event of a fault condition.

20 Claims, 12 Drawing Sheets

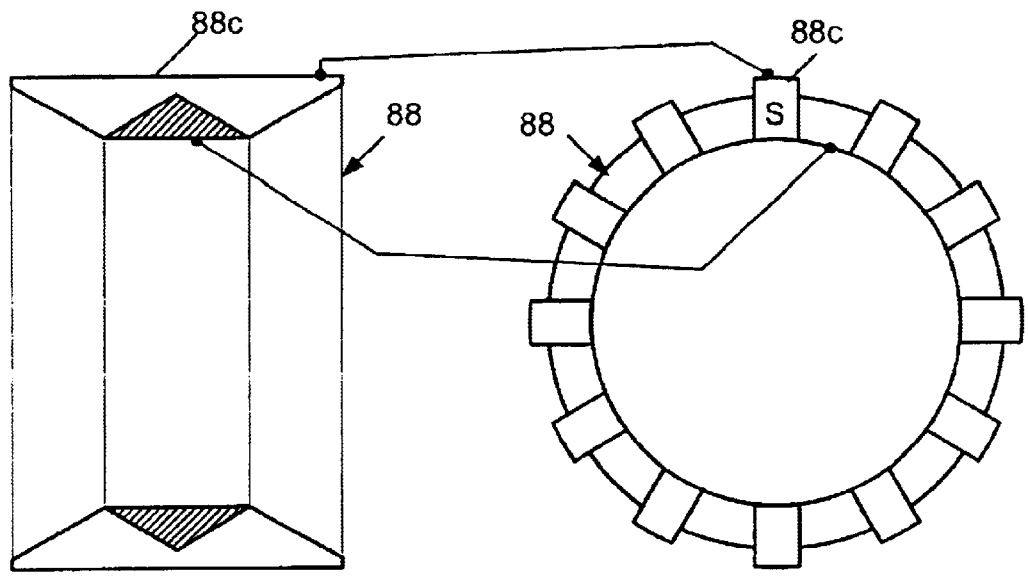
Fig. 10a
Fig. 10b
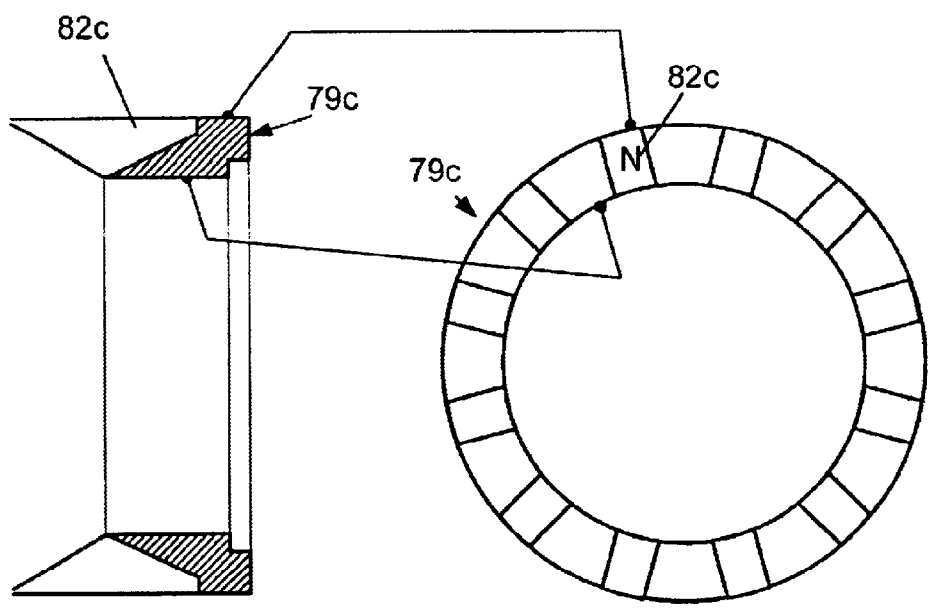
Fig. 10c
Fig. 10d

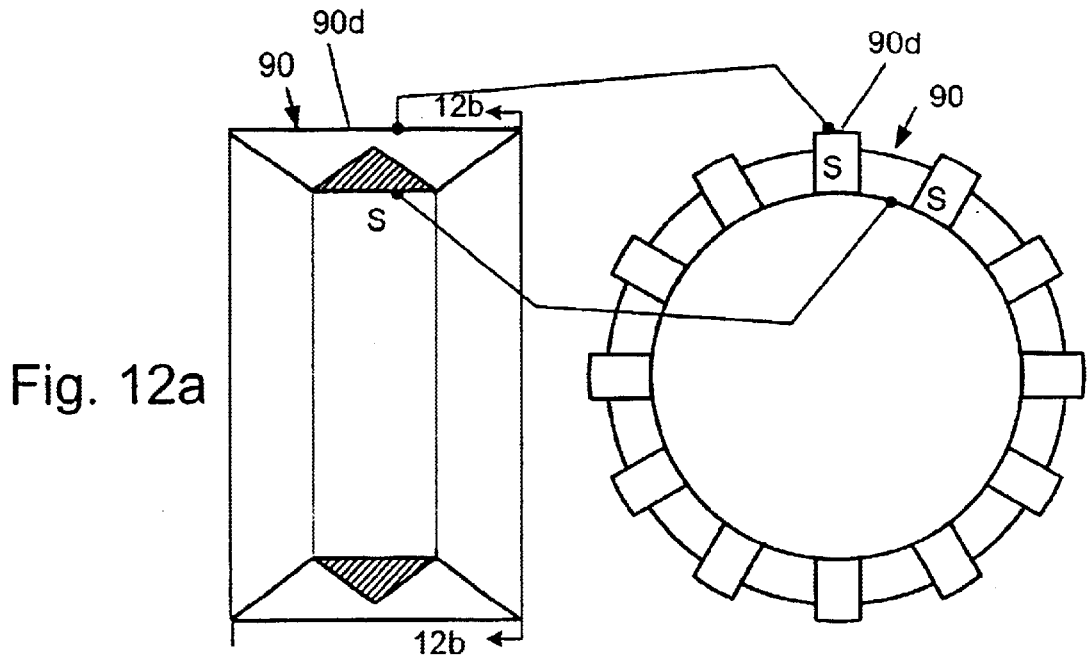
Fig. 12a
Fig. 12b
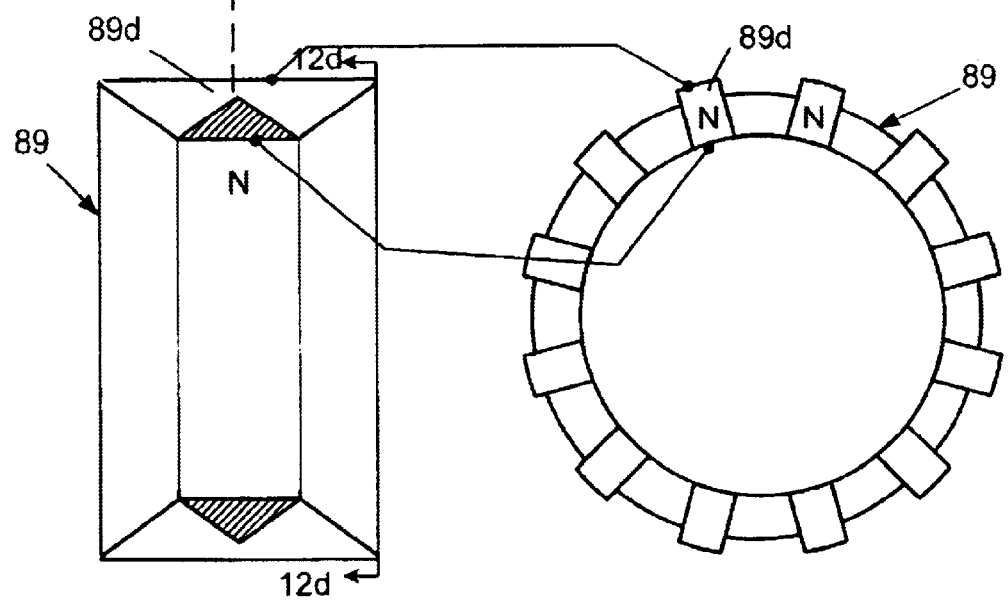
Fig. 12c
Fig. 12d

SUPERCONDUCTING PM UNDIFFUSED MACHINES WITH STATIONARY SUPERCONDUCTING COILS

CROSS-REFERENCE TO RELATED APPLICATIONS

The benefit of priority is claimed herein based on U.S. Provisional Application No. 60/413,248 filed Sep. 24, 2002. This application is also a continuation-in-part of Hsu, U.S. application Ser. No. 09/872,048, filed Jun. 1, 2001, now U.S. Pat. No. 6,573,634 and entitled "Method and Machine for High Strength Undiffused Brushless Operation."

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is electrical machines including motors and generators and the application of superconducting technologies to such machines.

BACKGROUND ART

The need for a high power, small volume, high efficiency, low cost, reliable electric machine is well understood. The applications include, but are not limited to, ship propulsion, industrial drives, power generation and transportation. The development of high temperature superconducting (HTS) wires offers a bright future for superconducting devices. In this context, "high temperature" means operation above a temperature of about 40 degrees Kelvin, which is still well below zero degrees Fahrenheit. A well known superconducting cooling assembly is referred to as a cryostat.

Dombrovski et al., U.S. Pat. No. 6,313,556, issued Nov. 6, 2001, discloses an AC synchronous motor with a stator, a rotor and a rotor winding of HTS wires which are cooled by a cryostat. The cryostat includes a refrigeration system that is connected through conduits in an extension of the rotor shaft into a vacuum chamber in the interior of the rotor. A cryogenic transfer coupling is provided to allow that portion of the superconducting structure which is inside the rotor to rotate with the rotor.

The reliability of a rotating cryostat is lower than that of a stationary cryostat for a comparable cost of manufacture. In the rotating system, the superconducting coils not only have to bear the motor torque but also have to be thermally isolated. This places a stringent requirement on the mechanical design which translates into a complicated design for the cryostat, with lower reliability and increased cost. Furthermore, when the machines of the prior art experience a failure in the superconducting system and lose the excitation flux, the motor cannot be rotated. The so-called "hop-along capability," which is the ability to rotate the rotor of a motor even under failure conditions, is practically zero.

Recently, a new type of machine referred to as a high strength undiffused brushless machine has been disclosed in Hsu U.S. application Ser. No. 09/872,048, filed Jun. 1, 2001. In this machine, additional excitation is provided by a stationary excitation winding which is positioned next to the rotor so as to induce a rotor-side flux in the rotor. Permanent magnet (PM) material is positioned in between the poles of the rotor to control the flux diffusion of the secondary flux produced by the additional excitation. The flux provided by the stationary excitation winding is thus available to increase or decrease a resultant flux in the main air gap. This invention is applicable to both axial gap and radial gap machines.

In known superconducting machines there is also a problem that back iron requirements are large in order to isolate the alternating flux. This adds to the weight of a high temperature superconducting motor. The overall wound core length that includes the core length and the length of the two winding end turns of a known superconducting machine may be quite long. Even when helical coils are used instead of the conventional armature coils, the overall core length is still quite long for a machine with lower numbers of poles in comparison with a PM machine that is capable for a machine with higher number of poles.

There are also limitations to increasing the number of poles in the prior art machines. Unlike a PM motor, the number of poles of a non-PM superconducting motors cannot be increased to a number as high as that of a PM motor. This is because the armature flux of a PM motor is guided by the iron but the armature flux of a non-PM superconducting motor flows freely in the air.

The present invention has been made to overcome the limitations of the prior art.

SUMMARY OF THE INVENTION

Prior superconducting motors and generators have used a rotating cryostat. The present invention uses a stationary cryogenic assembly together with permanent magnets (PM) to provide a new type of superconducting motors and generators. The problems associated with the conventional superconducting machines and conventional PM machines, such as reliability, hop-along capability, mechanical stress, cost, thermal isolation, and manufacturability problems, are significantly overcome through this new technology.

In the machine of the present invention, torque does not act on the superconducting coils. The present invention can use either high temperature or low temperature superconducting wires.

Unlike the prior superconducting machines, the superconducting machine of the present invention has a hop-along capability as a result of the presence of the PM material.

Unlike the prior superconducting machines, the superconducting machine of the present invention can be built with a high number of poles and with less length of superconducting wire than prior high temperature superconducting machines.

The machine of the present invention can be an axial-gap machine, a radial-gap machine or a radial-gap inverted machine. The inverted machine has an armature disposed in a central chamber in the rotor, which is separated from the armature by the main air gap. A stationary cryogenic assembly encircles the rotor and is spaced from the rotor by a secondary air gap.

The machine of the present invention can be built as a motor or a generator.

The machine of the present invention can use a multiple DC excitation coil arrangement.

The superconducting machine of the present invention can be built as either a disc-shaped or a barrel-shaped machine.

Unlike a conventional PM machine, the main air gap flux of this new machine can be weakened through control of the secondary excitation.

Unlike a conventional PM machine, the main air gap flux density of this new machine can be enhanced through control of the secondary excitation.

Unlike a conventional PM machine, the manufacturability of this new machine can be ensured by a predetermined excitation or by a magnetic short-circuiting approach.

The flux produced by the superconducting coils in the machine of the present invention is returned through the air, without requirements for back iron.

These and other objects and advantages of the invention will be apparent from the description that follows and from the drawings which illustrate embodiments of the invention, and which are incorporated herein by reference.

BRIEF DESCRIPTION OF THE DRAWINGS

FIGS. 10a–10d are detail views of part of the rotor assembly in the machine of FIG. 9;

FIGS. 12a–12d are detail views of part of the rotor assembly in the machine of FIG. 11.

DETAILED DESCRIPTION

Figure 1:
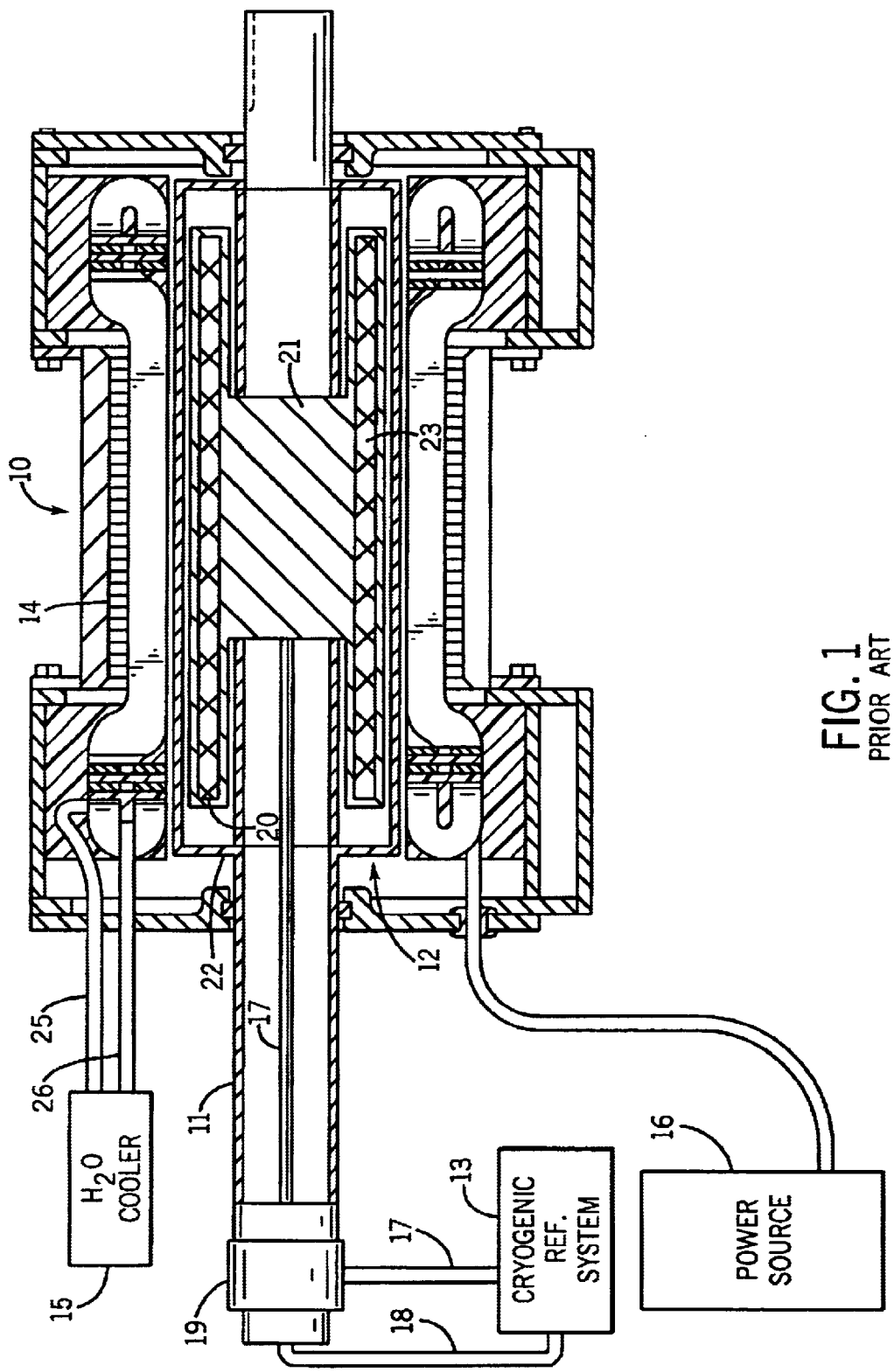
FIG. 1 is a longitudinal section view of a prior art machine.

FIG. 1 illustrates a superconducting machine of the prior art, as disclosed in Dombrovski et al., U.S. Pat. No. 6,313,556, issued Nov. 6, 2001.

As seen in FIG. 1, a superconducting motor 10 of the prior art includes a rotor 12 supported on a rotor shaft 11, a cryogenic refrigeration system 13 for supplying a cooling fluid to the rotor 12, and a stator 14 which produces a rotating electromagnetic field which causes the rotor 12 to rotate, a water cooling system 15 for the stator 14 and a power source 16 for the stator 14.

The cryogenic refrigeration system 13 is connected through conduits 17, 18 to a rotating cryogenic transfer coupling 19. Refrigerant fluid is transmitted through conduit 17 to the interior of the rotor 12. The refrigerant may comprise any suitable cryogenic fluid such as gaseous helium, liquid nitrogen, liquid neon, or liquid oxygen. For the purpose of this example, the refrigerant will be assumed to be gaseous helium. The rotor 12 rotates with the rotor shaft 11 and includes a rotor winding 20, a coil support structure 21 which supports the rotor winding 20, and a vacuum jacket 22 surrounding the coil support structure 21 to thermally insulate them. The coil support structure 21 is positioned axially centrally of the rotor 12 and has an outer radial portion 22 which is hollow so as to form a cavity 23 that houses the rotor winding 20. The coil support structure 21 is in intimate thermal contact with cryogenic fluid supplied by the supply conduit 17 and, therefore, is sufficiently cooled by the cryogenic fluid to provide effective conductive heat transfer between the rotor winding 20 and the cryogenic fluid, thereby rendering the rotor winding 20 superconductive.

In this machine, the stator 14 was also cooled by circulating a liquid coolant such as water through the stator 14 in a closed loop via supply and return conduits 25 and 26 extending between the water cooler 15 and the stator 14.

In contrast to the above-described prior art, the superconducting machine of the present invention is a further development of the machine first disclosed in Hsu, U.S. application Ser. No. 09/872,048, filed Jun. 1, 2001, and entitled "Method and Machine for High Strength Undiffused Brushless Operation." The disclosure there is hereby incorporated by reference. To summarize, this machine has three major portions: 1) a wound armature core, 2) a stationary DC field excitation, and 3) a rotor situated between them. The machine can be configured either as an axial-gap machine or a radial-gap machine. The rotor acts as a flux inverter that changes the stationary DC flux to a multiple-pole flux rotating with the rotor. There is no torque produced between the stationary DC field excitation and the rotor, because the flux remains constant when the rotor is turning. The torque production of the rotor on the side facing the armature is the same as that of a synchronous machine or a brushless DC machine.

As an advantage over this non-superconducting PM machine, the field excitation portion of the superconducting machine of the present invention does not require a back iron component as the flux return path for the flux produced by the superconducting coils. This flux can go through the air. This not only makes the machine lighter but also eliminates a saturable component. Consequently, the fact that the air-gap flux density can be increased in turns raises the power density of the machine.

Like the PM non-superconducting motor, PM material in the present invention is positioned in the spaces between the poles of the rotor, to control diffusion or leakage of the flux between the rotor poles. Flux from the DC field excitation is guided through the multiple rotor poles to the main air gap, unless the polarity of the DC current in the excitation winding is reversed so as to allow diversion of the PM fluxand weaken flux in the main air gap. The PM material can also produce flux to ensure the hop-along capability.

Figure 2:
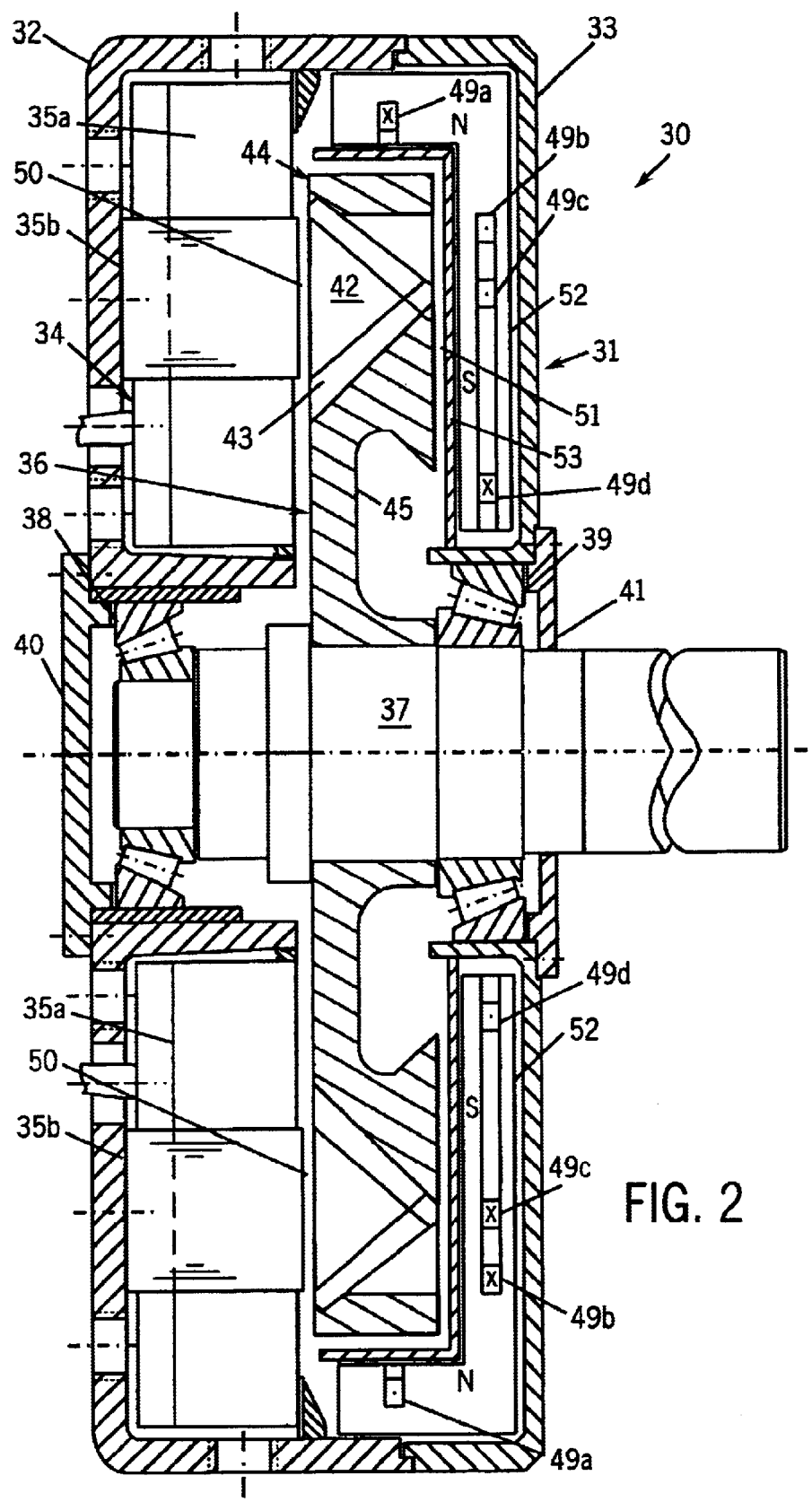
FIG. 2 is a longitudinal section view of an axial gap machine of the present invention.

The following examples for the axial-gap and the radial-gap versions illustrate the present invention. FIG. 2 shows an axial-gap version of the invention. FIG. 2 is a sectional view of a disc-shaped motor 30 having a motor housing 31 with two portions 32 and 33. A stator 34 has a number of teeth 35b and a number of stationary armature windings 35a wound around the teeth 35b to form stator poles. A disc-shaped rotor 36 is mounted on a shaft 37 having a front end supported in bearing 38 in a central opening in housing portion 32 and a rear end supported in bearing 39 in a central opening in housing portion 33. Disc-shaped cover 40 closes the opening in the housing portion 32 and an annular cover piece 41 encloses the bearing cavity in housing portion 33.

Figure 3:
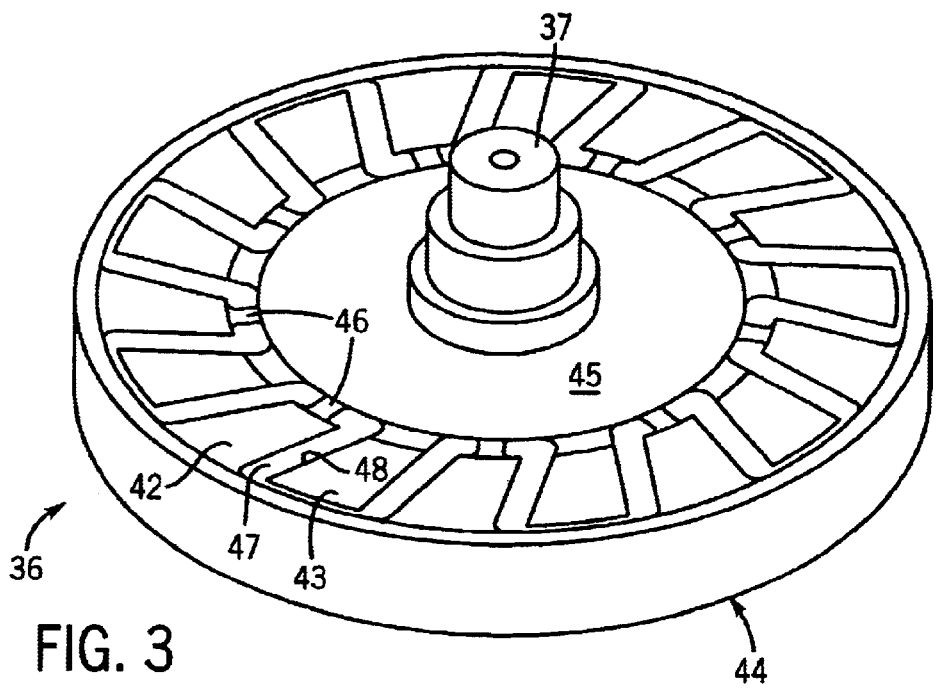
FIGS. 3 and 4 are front and back perspective views of a rotor in the machine of FIG. 2.
Figure 4:
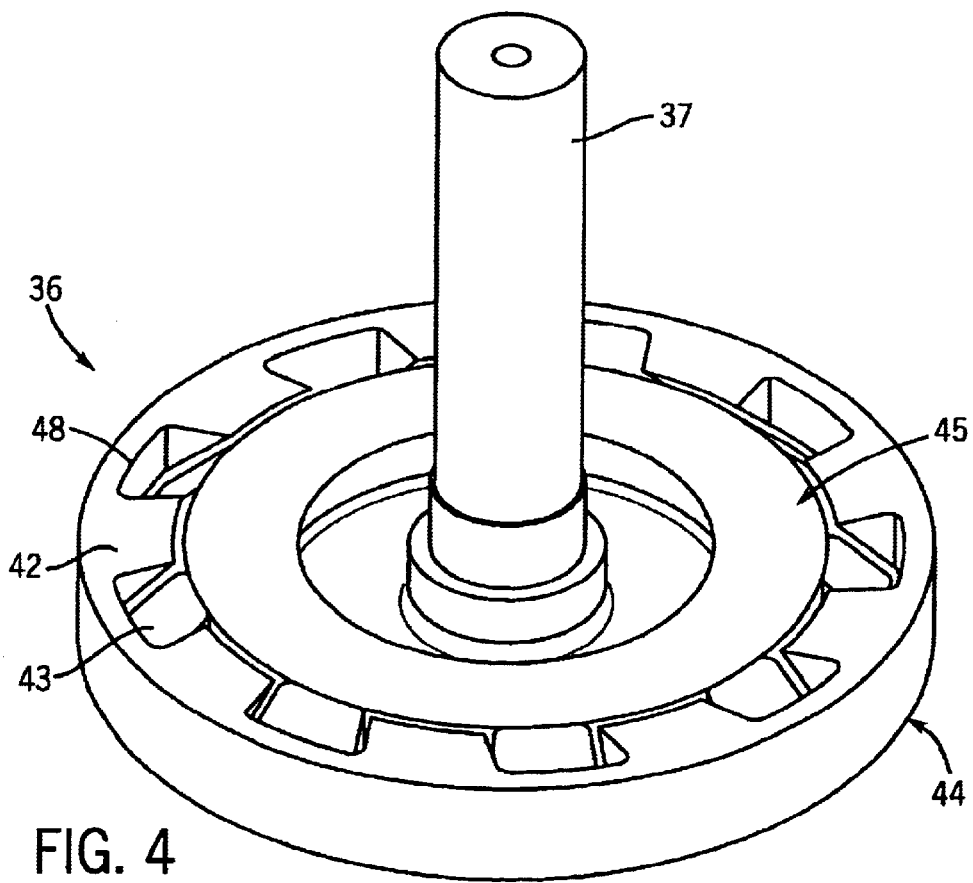

The rotor 36 is seen best in FIGS. 3 and 4, in which rotor poles 42, 43 are formed by teeth on two respective portions 44, 45 that are joined by brazings 46 of non-magnetic material. Permanent magnet (PM) material 47 is placed in the spaces 48 formed between the teeth 42, 43 to block leakage of flux for enhancing the main air-gap flux or to prevent the PM flux go to the main air-gap for field weakening depending on polarity of the secondary field excitation.

Returning to FIG. 2, the side of the rotor seen in FIG. 3 faces the stator 34 across a main air gap 50. Behind the rotor 36, four superconducting coils 49a–49d are positioned for secondary excitation of the rotor 36 across a secondary air gap 51. The superconducting coil(s) 49a–49d are arranged in a stationary cryogenic enclosure 52. The wall of this enclosure 52 is a vacuum jacket for thermal isolation. The inside of this enclosure receives circulating refrigerant fluid from a source (not shown). The superconducting disc coils 49a–49d are positioned and arranged as shown in FIG. 2 to produce a two-pole (N and S) ring flux pattern. Instead of back iron, the superconducting coils 49a–49d and enclosure 52 are enclosed by a portion of the housing 33 having either ferromagnetic or non-ferromagnetic properties. Consequently, magnetic saturation of the housing is not a limiting factor for producing the high air-gap flux density in the rotor poles. The number of poles in this machine can be high for reducing the overall dimensions of the machine.

A disc-shaped flux shield 53 is positioned between the superconducting coil enclosure 52 and the secondary air gap 51. The purpose of this flux shield 53, which is known in the art, is to magnetically short circuit any alternating flux which is not in synchronism with the rotation of the rotor 36, this flux being induced largely by the stator windings 35a.

A feature of this motor 30 is provided when the superconducting field excitation portion 49a–49d experiences a fault condition and cannot function. In this case the PM material 47 between the rotor poles 42, 43 produces air-gap flux in the main air gap 50. The motor 30 still can "hop along" at a reduced speed.

Figure 5:
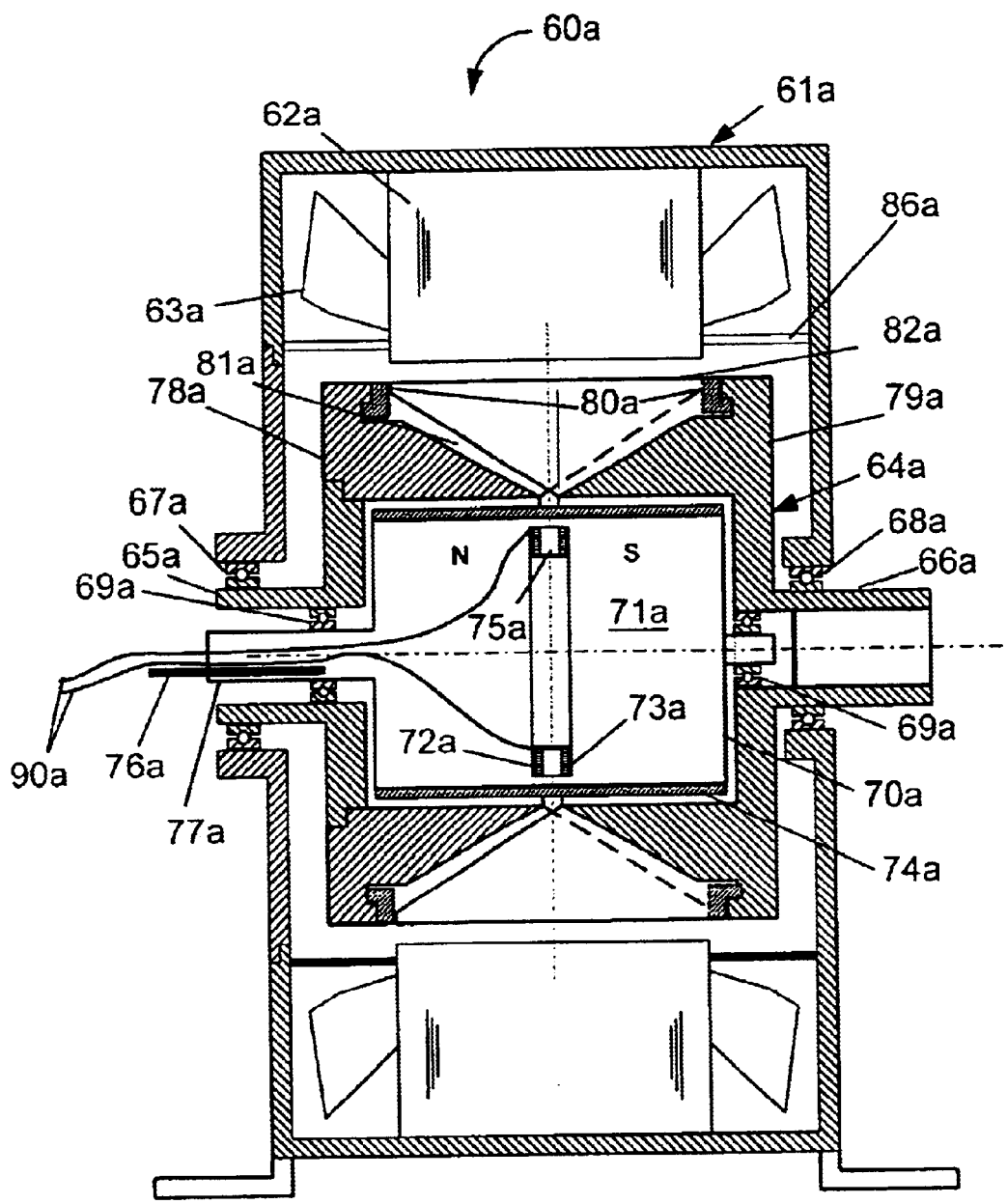
FIG. 5 is longitudinal section view of a first radial gap machine of the present invention.

FIG. 5 shows a radial-gap superconducting high strength undiffused PM machine 60a. The technological principle of a radial-gap machine 60a is similar to that of the axial gap superconducting machine 30. This motor 60a is shown with a motor housing 61a, a stator core 62a, and stator or armature windings 63a. A barrier 86a is provided to form an optional cooling chamber for the stator 62a, 63a. Cooling fluid would be circulated through the chamber from an external source (not shown).

A rotor 64a of generally cylindrical shape is supported by shaft portions 65a, 66a for rotation in insulated bearings 67a, 68a. Inside the rotor shaft portion 65a is a second pair of insulated bearings 69a, which allow the rotor 64a to rotate around a stationary chamber 70a whose wall is a vacuum jacket for containing a cryogenic fluid 71a and superconducting coils 72a, 73a. The chamber 70a is encircled by a flux shield 74a to shield the coils 72a, 73a from alternating flux, induced primarily by stator windings 63a. The coils 72a, 73a are mounted on a common support of non-magnetic material 75a, which provides separation between the fluxes from the respective coils 72a, 73a. Wire connections 90a for the coils 72a, 73a and a conduit 76a extend through a hollow cylindrical tube 77a for the refrigerant fluid leads into the chamber 70a. Each coil 72a, 73a provides a pole (N or S) from inside the rotor 64a.

Figures 6A, 6B:
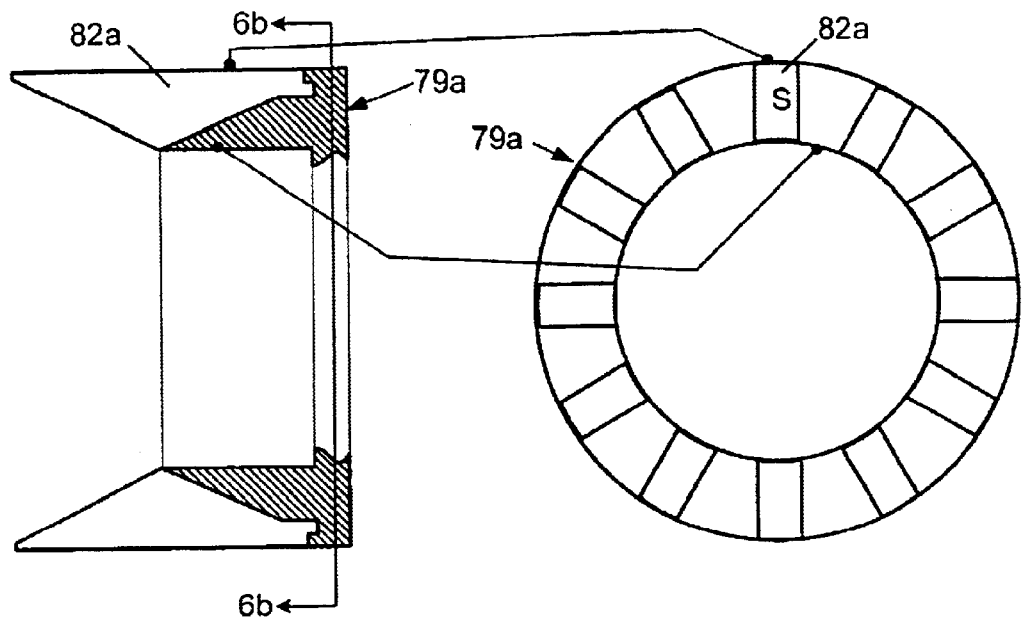
FIGS. 6a–6d are detail views of part of the rotor assembly in the machine of FIG. 5.
Figures 6C, 6D:
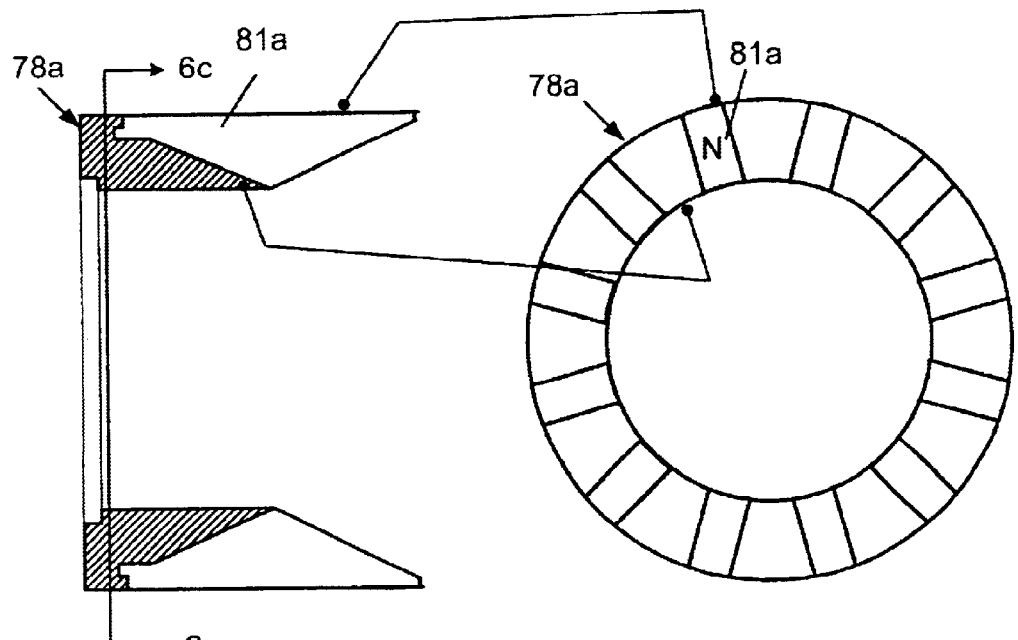
Figure 7:
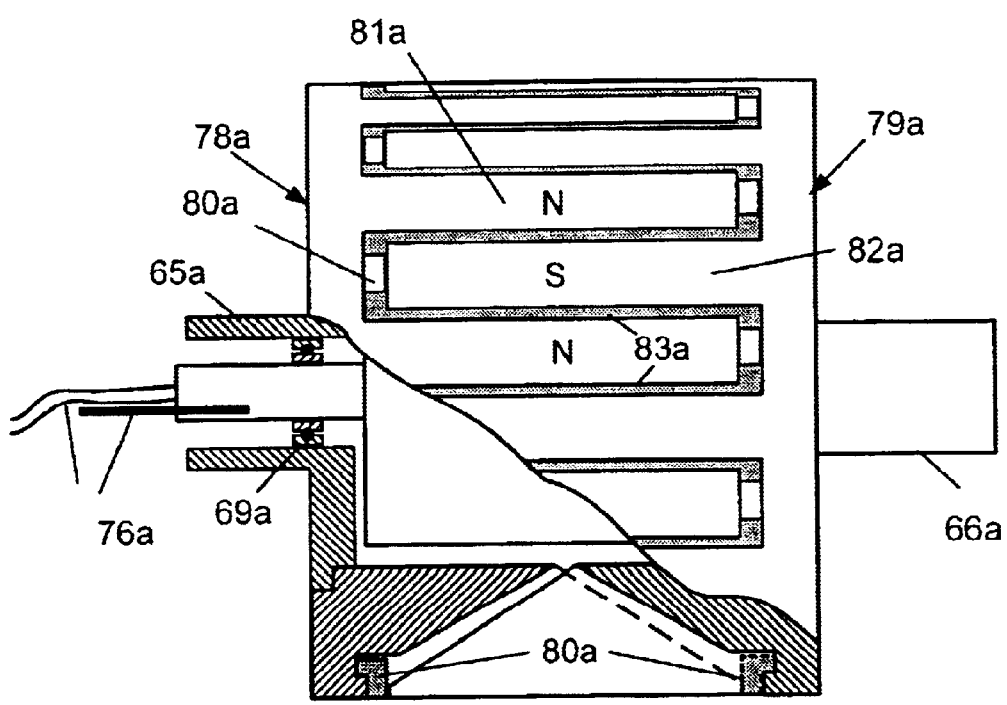
FIG. 7 is a side elevational view of the rotor assembly in the machine of FIG. 5 with a part in section.

As seen in FIGS. 6a–6d, the rotor 64a is an assembly that is formed by joining two complementary pieces 78a, 79a of ferromagnetic material (steel) using non-magnetic brazings 80a (FIG. 5) so as not to magnetically short circuit the two pieces 78a, 79a. As seen in FIGS. 6b and 6d, each rotor section 78a, 79a provides twelve spaced apart poles 81a, 82a of one respective polarity (N or S) around its circumference. The number of poles of each polarity can be different from the "twelve" used for this example. As further seen in FIG. 7, when the rotor sections 78a, 79a are assembled, this produces an alternating and complementary arrangement of north (N) poles 81a and south (S) poles 82a, with PM material 83a positioned in spaces between the poles 81a, 82a.

Referring again to FIG. 5, the wound stator core 62a, the stationary DC field excitation coils 72a, 73a, and the rotor 64a situated between them are the three major components in a radial-gap superconducting machine. A cryogenic cooling chamber 70a, AC flux shield 74a, and superconducting disc coils 72a, 73a form the DC flux excitation assembly. The north and south pole fluxes produced by the superconducting disc coils go into the two pieces 78a, 79a of the rotor 64a facing the excitation. The rotor is a flux inverter that changes the stationary DC flux to a multiple-pole flux rotating with the rotor. There is no torque produced between the stationary DC field excitation and the rotor, because the flux remains constant when the rotor is turning. The torque production of the rotor 64a on the side facing the stator 62a, 63a is the same as that of a synchronous machine or a brushless DC machine.

Figure 8:
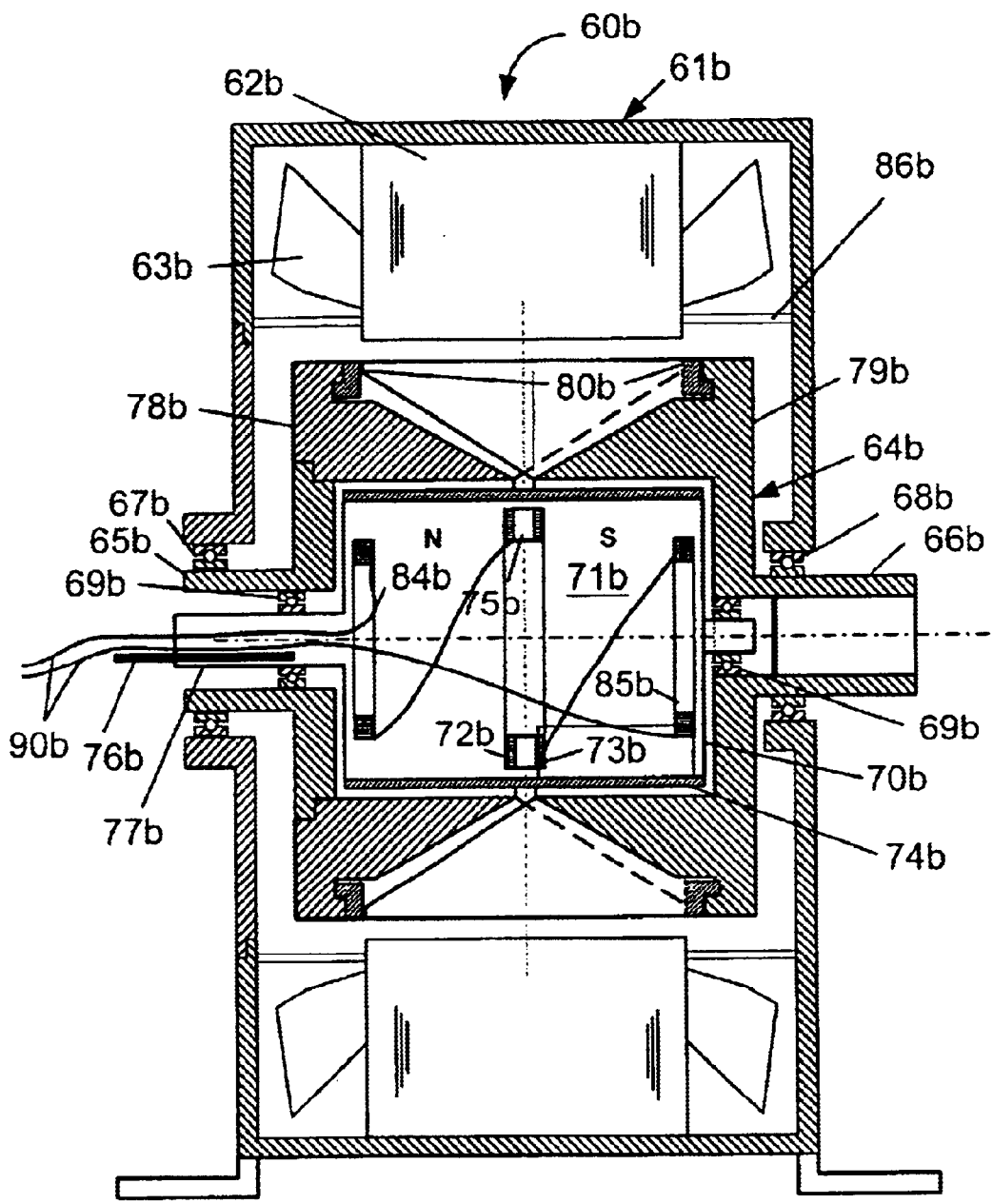
FIG. 8 is a longitudinal section view of the radial gap machine of FIG. 5 with the addition of boundary superconducting coils.

FIG. 8 shows a radial gap version of the machine similar to FIG. 5 with one modification. In FIG. 8, parts similar to the parts in FIG. 5 have the same number except for a "b" suffix. The modification incorporates two additional boundary superconducting coils 84b, 85b, which are provided to provide a stronger pair of N and S poles in the rotor 64b. The machine has a motor housing 61b, a stator core 62b, and stator or armature windings 63b corresponding to the parts for the previous embodiment. A rotor 64b of generally cylindrical shape is supported by shaft portions 65b, 66b for rotation in insulated bearings 67b, 68b. Inside the rotor shaft portion 65b is a second pair of insulated bearings 69b, which allow the rotor 64b to rotate around a stationary chamber 70b whose wall is a vacuum jacket for thermal isolation. The stationary chamber 70b contains a cryogenic fluid 71b and superconducting coils 72b, 73b, 84b, and 85b. The chamber 70b is encircled by a flux shield 74b to shield the coils 72b, 73b, 84b, and 85b from alternating flux, induced primarily by stator windings 63b. The coils 72b, 73b are mounted on a common support of non-magnetic material 75b, which provides separation between the fluxes from the respective coils 72b, 73b. In addition, two boundary superconducting coils 84b, 85b, are provided to provide a stronger pair of N and S poles in the rotor 64b. Wire connections 90b for the coils 72b, 73b, 84b, 85b and a conduit 76b for the refrigerant fluid extends through a hollow cylindrical tube 77b leading into the chamber 70b.

Figure 9:
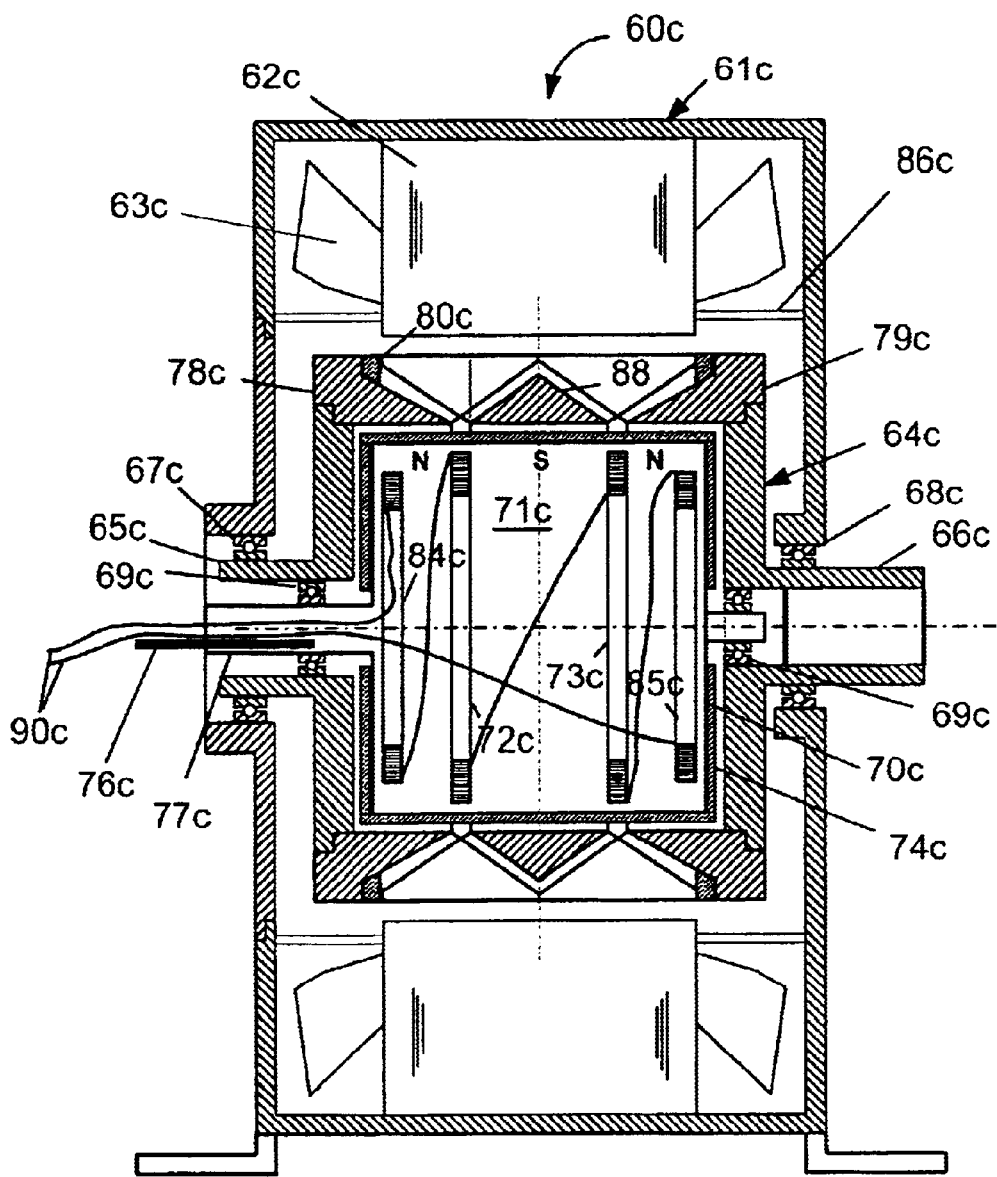
FIG. 9 is a longitudinal section view of a radial gap machine of the present invention with one additional rotor pole section.

FIG. 9 shows a radial gap machine of the present invention with an additional rotor pole section. This provides for sets of three (N-S-N) pole sections on the inner surface of the rotor. This embodiment demonstrates the technology for the machine with a relatively long rotor 64c with a smaller diameter by providing additional pole sections inside the rotor 64c. The inner periphery of the rotor is divided into a center cylinder 88 and two side cylinders 78c, 79c. The axial length of a taper portion of the rotor poles 82c (FIG. 10c) is about half of those shown in FIGS. 7 and 8. Consequently, the radial thickness of the rotor can be made thinner.

In FIG. 9, parts similar to the parts in FIGS. 5 and 8 have the same number except for a "c" suffix. This includes a motor housing 61c, a stator core 62c, and stator or armature windings 63*c* corresponding to the parts illustrated in the previous figures. A rotor 64*c* of generally cylindrical shape is supported by shaft portions 65*c*, 66*c* for rotation in insulated bearings 67*c*, 68*c*. Inside the rotor shaft portion 65*c* are the second insulated bearings 69*c*, which allows the rotor 64*c* to rotate around a stationary chamber 70*c* whose wall is a vacuum jacket for thermal isolation. The stationary chamber 70*c* contains a cryogenic fluid 71*c* and superconducting coils 72*c*, 73*c*, 84*c*, and 85*c*. The chamber 70*c* is encircled by a flux shield 74*c* to shield the coils 72*c*, 73*c*, 84*c*, and 85*c* from alternating flux, induced primarily by stator windings 63*c*. The coils 72*c*, 73*c* are spaced apart in this embodiment to provide an additional pole section inside the rotor. The additional two boundary superconducting coils 84*c*, 85*c*, are provided to provide a stronger pair of N and S poles in the rotor 64*c*. Wire connections 90*c* for the coils 72*c*, 73*c*, 84*c*, 85*c* and a conduit 76*c* for the refrigerant fluid extends through a hollow cylindrical tube 77*c* leading into the chamber 70*c*.

In this embodiment, there is an extra rotor pole section 88 of the rotor 64*c* that fits between end pieces 78*c*, 79*c*. As seen in FIGS. 10*a* and 10*b*, the middle section 88 provides twelve radially extending and spaced apart south (S) poles 88*c*. This section fits between two end sections 78*c*, 79*c*, one of which is shown in FIGS. 10*c* and 10*d*, and both of which having twelve radially extending and spaced apart south (N) poles 82*c*. The north (N) poles are offset by an angle from the south (S) so that the poles will fit together in a complementary fashion similarly to the depiction in FIG. 7, with the south (S) poles 88*c* being twice as long as, and extending alongside, the north (N) poles from each of the respective end sections 78*a*, 79*a*.

Figure 11:
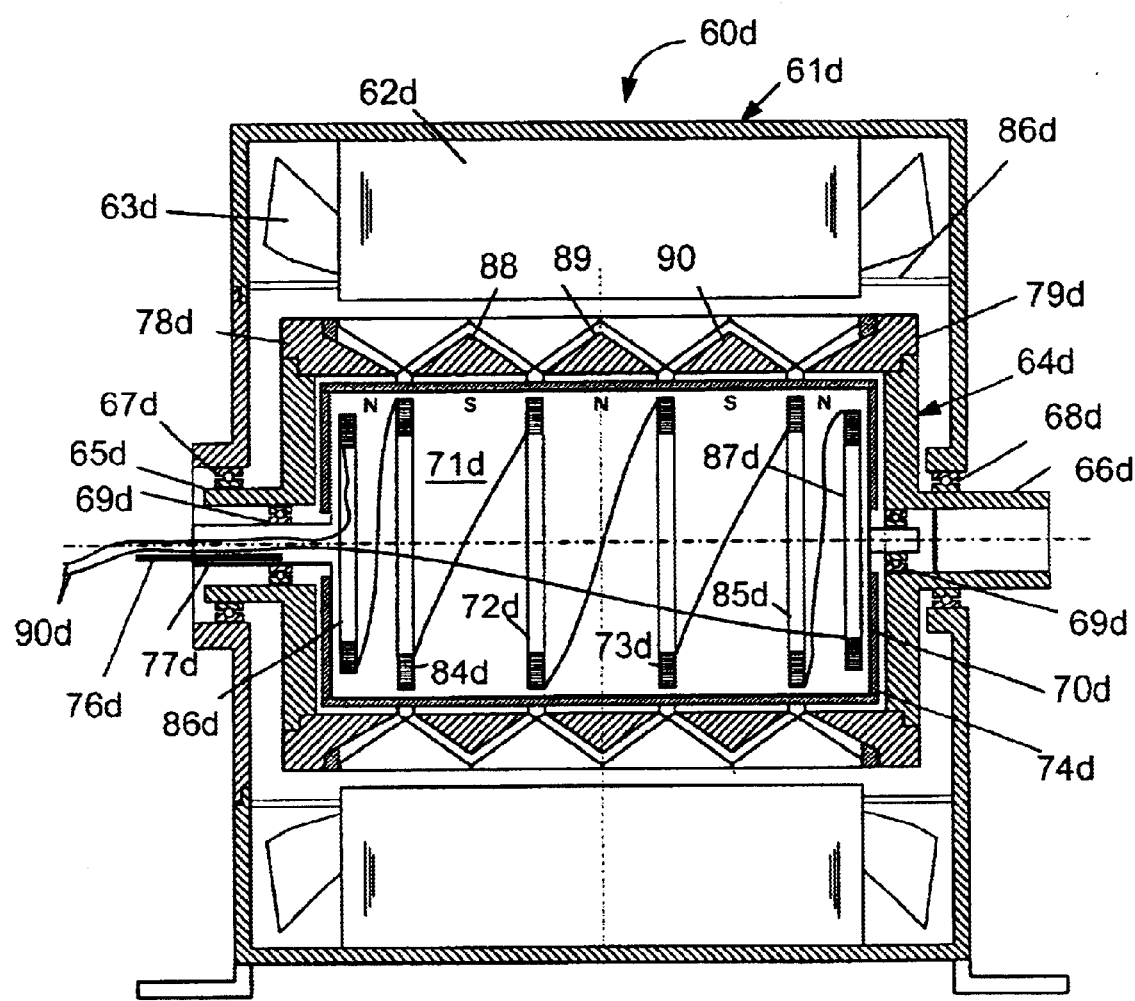
FIG. 11 is a longitudinal section view of a radial gap machine of the present invention with three additional rotor pole sections.

FIG. 11 shows an embodiment that is designed to have an even longer rotor 64*d* and with a relatively smaller diameter, using an arrangement of six spaced apart superconducting coils 72*d*, 73*d*, 84*d*, 85*d*, 86*d* and 87*d* disposed in a stationary cryogenic chamber 70*d* surrounded by an AC flux shield 74*d*. These coils provide five stationary poles inside the rotor 64*d*. The rotor 64*d* is formed by end pieces 78*d*, 79*d* and several intermediate pieces 88, 89, 90, which provides sets of five alternating pole sections (N-S-N-S-N) on the inner surface of the rotor 64*d*. The rotor 64*d* is formed by cylindrical end pieces 78*d*, 79*d* and cylindrical intermediate pieces 88, 89, 90 for providing the alternating poles on the outer surface of the rotor 64*d*.

FIGS. 12*a* and 12*b* show the details of one of the intermediate rotor sections 88, 90 providing twelve radially extending and circumferentially spaced south (S) poles 90*d*. FIGS. 12*c* and 12*d* show the details of one of the intermediate rotor sections 89 providing twelve radially extending and circumferentially spaced north (N) poles 89*d*. In addition, end rotor sections 78*d*, 79*d* would provide twelve radially extending and circumferentially spaced north (N) poles. When the sections 78*d*, 79*d*, 88, 89, 90 are joined by non-magnetic joints, the south poles and north poles of the intermediate sections 88, 89 and 90 overlap each other and the shorter poles of the end sections 78*d*, 79*d*, which are similar to those sections in previous embodiments to provide a rotor assembly 64*d* with 5×12 N-S rotor poles.

Figure 13A:
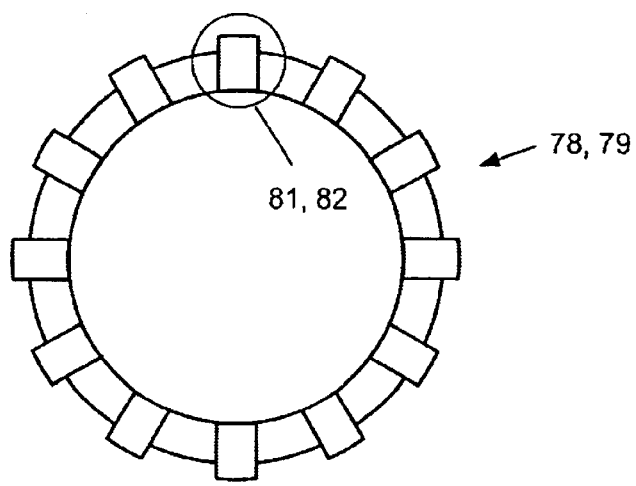
FIGS. 13a–13e are detail views of rotor pole configurations for the machines of the present invention.
Figure 13B:
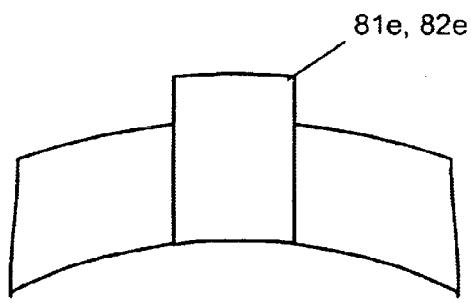
Figure 13C:
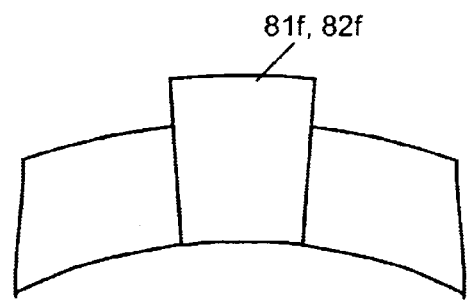
Figure 13D:
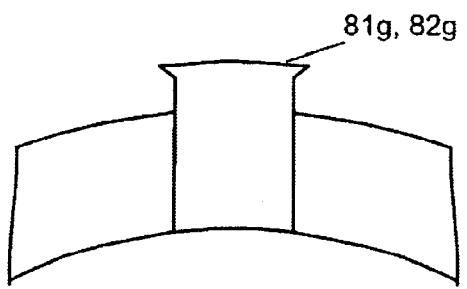
Figure 13E:
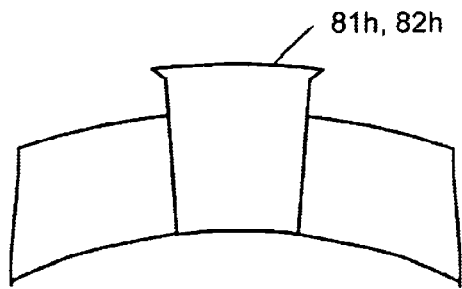

FIGS. 13*a*–13*e* shows examples of different pole shapes of a radial-gap superconducting rotor. The rotor poles 81, 82 can be either straight or skewed with respect to the stator teeth. The pole shape when seen from the side can be rectangular for poles 81*e*, 82*e* as seen in FIG. 13*b* or trapezoidal for poles 81*f*, 82*f* as seen in FIG. 13*c*. The poles can be flared at the pole face to provide a pole face of enlarged area facing the main air gap 50 as seen for rectangular poles 81*g*, 82*g* in FIG. 13*d* and as seen for trapezoidal poles 81*h*, 82*h* in FIG. 13*e*. Similar poles shapes can be employed with the axial gap machine of FIG. 2.

This has been a description of several preferred embodiments of the invention. It will be apparent that various modifications and details can be varied without departing from the scope and spirit of the invention, and these are intended to come within the scope of the following claims.

We claim:

1. A brushless electric machine having a stator and a rotor spaced from the stator to define a main air gap, the stator producing a first flux in the rotor and the main air gap, the machine further comprising:

a rotor having an axis of rotation and having a plurality of rotor poles disposed at least partly around the axis of rotation and facing the main air gap, the plurality of rotor poles being spaced apart and having PM material disposed in the spaces between said rotor poles for blocking conduction of a second flux between said two rotor poles when excited by a direct current of one polarity;

at least one stationary excitation coil that is separated from the rotor by a secondary air gap, for conducting direct current so as to induce the second flux in the rotor poles across the secondary air gap, said flux being conducted through the rotor to reach the main air gap; and a stationary cryogenic cooling enclosure for containing the stationary excitation coil and for cooling the stationary excitation coil, such that the stationary excitation coil is operated in a superconducting state.

2. The machine of claim 1, wherein said main air gap is a first axial air gap between the stator and the rotor, and wherein said cryogenic cooling enclosure is separated from the rotor by a second axial air gap on a back side of the rotor opposite a front side facing the main air gap.

3. The machine of claim 1, wherein the cryogenic cooling enclosure is disposed in a common housing with the rotor and the stator.

4. The machine of claim 3, wherein the cryogenic cooling enclosure and stationary excitation coil are free of any substantial back iron outside of the rotor.

5. The machine of claim 1, wherein said main air gap is a first radial air gap between the stator and the rotor, and wherein said stationary cryogenic cooling enclosure is disposed in a central cavity formed in the rotor and is separated from the rotor by a second radial air gap on an inner side of the rotor opposite an outer side facing the main air gap.

6. The machine of claim 1, wherein said cryogenic cooling enclosure encloses multiple stationary superconducting excitation coils spaced axially along an axis of the rotor.

7. The machine of claim 1, wherein said one stationary excitation coil is disposed inside the stationary cryogenic cooling enclosure in a body of cryogenic fluid having a temperature above about 40 degrees Kelvin.

8. The machine of claim 1, wherein said one stationary excitation coil is disposed inside the stationary cryogenic cooling in a body of cryogenic fluid having a temperature below about 40 degrees Kelvin.

9. The machine of claim 1, wherein the machine is brushless AC synchronous machine.

10. The machine of claim 1, wherein the machine is a brushless DC machine.

11. The machine of claim 1, wherein the machine is a motor.

12. The machine of claim 1, wherein the machine is a generator.

13. The machine of claim 1, wherein the rotor is formed of at least two portions of magnetic material forming alternating and complementary rotor poles, said two portions of the rotor being joined by non-magnetic joints.

14. The machine of claim 13, wherein the rotor poles project radially from a center axis of the rotor and have a side profile of rectangular shape.

15. The machine of claim 14, wherein the rotor poles have a flared end portion providing a pole face of enlarged area facing the main air gap.

16. The machine of claim 13 wherein the rotor poles a side profile of trapezoidal shape.

17. The machine of claim 16, wherein the rotor poles have a flared end portion providing a pole face of enlarged area facing the main air gap.

18. The machine of claim 1, wherein the rotor is formed of at least three portions of magnetic material forming alternating and complementary rotor pole portions, said three portions of the rotor being joined by non-magnetic joints.

19. The machine of claim 1, wherein is formed of at least five portions of magnetic material forming alternating and complementary rotor pole portions, said five portions of the rotor being joined by non-magnetic joints.

20. A method of controlling flux in a brushless electrical machine having a stator with a primary excitation winding and a rotor separated by a main air gap, the method comprising:

passing a current through the primary excitation winding on the stator to induce a first flux across the main air gap into the rotor;

passing a direct current through a secondary excitation coil;

positioning a cyrogenic cooling enclosure enclosing a secondary excitation coil in a position separated from the main air gap by the rotor, the secondary excitation coil inducing a second flux in the rotor when said secondary excitation coil is conducting direct current; and positioning portions of PM material in spaces between two portions of the rotor, wherein said PM material blocks the second flux induced in the rotor from conduction between two portions of the rotor when current in the secondary excitation coil is in one direction to increase total flux in the main air gap and wherein said PM material conducts the second flux between the two portions of the rotor when current in the secondary excitation coil is in an opposite direction to weaken flux in the main air gap.

* * * * *

UNITED STATES PATENT AND TRADEMARK OFFICE
CERTIFICATE OF CORRECTION

PATENT NO. : 6,700,297 B2
DATED : March 2, 2004
INVENTOR(S) : John S. Hsu et al.

It is certified that error appears in the above-identified patent and that said Letters Patent is hereby corrected as shown below:

Column 9,
Lines 10-11, after "rotor poles" the words -- project radially from a center axis of the rotor and have -- should be inserted.

Signed and Sealed this

Twenty-third Day of November, 2004

JON W. DUDAS
*Director of the United States Patent and Trademark Office*